Sept. 15, 1959
J. ROMANELLI
2,904,706
PULSE FORMING NETWORK
Filed June 25, 1958
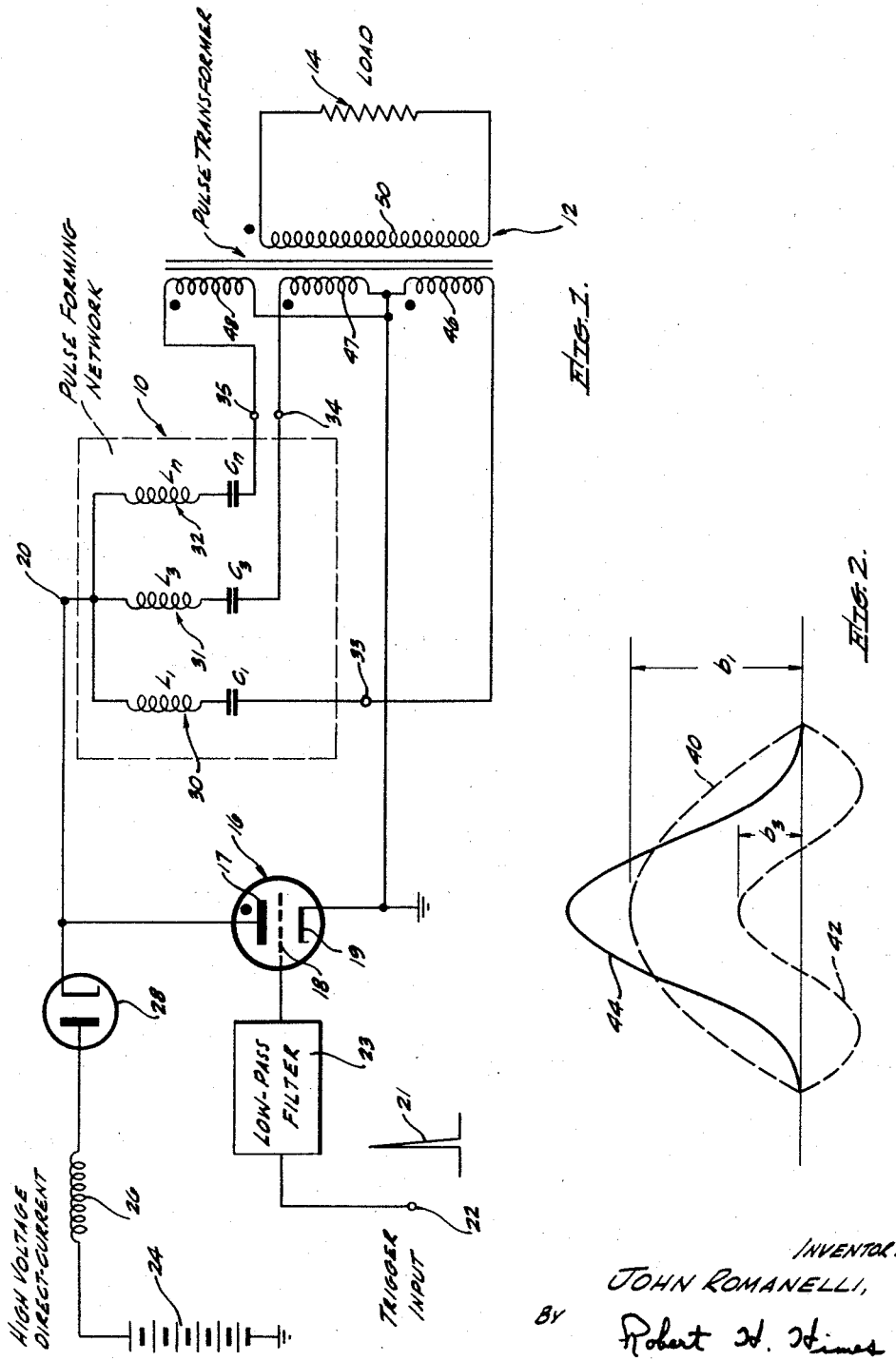
INVENTOR.
JOHN ROMANELLI,
BY Robert H. Himes
AGENT

UNITED STATES PATENT OFFICE 2,904,706
Patented Sept. 15, 1959

2,904,706

PULSE FORMING NETWORK

John Romanelli, Fullerton, Calif., assignor to Hughes Aircraft Company, Culver City, Calif., a corporation of Delaware Application June 25, 1958, Serial No. 745,796

3 Claims. (Cl. 307—106)

The present invention relates to a device for generating a particular type of pulse and more particularly to apparatus for generating pulses having a desired energy distribution and time duration which pulses are of a predetermined waveform.

In accordance with the present invention, a plurality of inductance-capacitance branches having parameter values which represent the odd harmonics of a Fourier expansion are discharged into a corresponding number of primary windings of a pulse transformer. This pulse transformer possesses a single output winding which is poled in a manner relative to the primary windings to produce an algebraic sum of the aforementioned odd harmonics thereby to produce pulse waveforms described by the trigonometric function, $\cos^2 \omega t$.

It is therefore an object of the present invention to provide an improved apparatus for generating pulses each having a predetermined energy distribution and time duration.

Another object of the invention is to provide apparatus for simultaneously generating a plurality of electrical signals representative of selected Fourier components and effectuating the algebraic sum of the components to produce a pulse having a predetermined energy distribution and time duration.

Still another object of the invention is to provide apparaus for simultaneously generating electric wave signals representative of the first and third Fourier components of a pulse having a waveform described by $\cos^2 \omega t$ and combining the electric wave signals to produce a pulse of a waveform substantially described by $\cos^2 \omega t$.

The above-mentioned and other features and objects of this invention and the manner of obtaining them will become more apparent by reference to the following description taken in conjunction with the accompanying drawings, wherein:

Fig. 1 illustrates a schematic circuit diagram of the apparatus of the present invention; and Fig. 2 shows the manner in which the Fourier components are combined to produce the pulse having a waveform described by $\cos^2 \omega t$.

There is illustrated a preferred embodiment of the apparatus of the present invention, which apparatus comprises a pulse-forming network 10 that is adapted to be discharged through a pulse transformer 12 into a load 14 by means of a switch tube 16 which may, for example, be a hydrogen thyratron. The tube 16 includes a plate 17, a control grid 18 and a cathode 19, the plate 17 being connected to an input terminal 20 of the pulse forming network 10 and the cathode 19 being connected to ground. The switch tube 16 is rendered conductive by the application of a trigger pulse 21 to a trigger input terminal 22, whereupon the trigger pulse 21 is coupled through a low pass filter 23 to the control grid 18 of the switch tube 16. The purpose of the low pass filter 23 is to prevent the momentary rise in grid potential prior to the grid cathode space being ionized from reaching the source of trigger input pulses.

The pulse forming network 10 is charged by way of example by means of a source 24 of high voltage direct current potential, negative terminal of which is referenced to ground and the positive terminal of which is connected through a charging inductor 26 and an isolating diode 28 to the input terminal 20 of the pulse forming network 10.

More particularly, the pulse forming network 10 includes impedance branches 30, 31 and 32 connected from the input terminal 20 to output terminals 33, 34 and 35, respectively. In the present case, each of the impedance branches 30, 31 and 32 are used to generate the first, third and nth harmonic of a pulse having a waveform described by $\cos^2 \omega t$. In particular, the impedance branch 30 constitutes the series combination of inductor $L_1$ and capacitor $C_1$ connected in series combination between the input terminal 20 and the output terminal 33; the impedance branch 31 constitutes an inductor $L_3$ and a capacitor $C_3$ connected in series combination between the input terminal 20 and the output terminal 34 and the impedance branch 32 constitutes an inductor $L_n$ and a capacitor $C_n$ connected in series combination from the input terminal 20 to the output terminal 35 of the pulse forming network 10. In accordance with the present invention, it is essential that the values of the aforementioned inductors and capacitors be determined in accordance with the following relations so that electrical signals of the proper harmonic and of the desired amplitude may be generated:

$$L_n = \frac{t_o R_o \sqrt{4-b_n^2}}{2n\pi b_n} \tag{1}$$

$$C_n = \frac{t_o b_n \sqrt{4-b_n^2}}{2n\pi R_o} \tag{2}$$

wherein $$n = 1, 3, 5 \ldots \tag{3}$$

$$b_n = \frac{\sin \frac{n\pi}{2}}{\frac{n\pi}{2}\left[1-\left(\frac{n}{2}\right)^2\right]} \tag{4}$$

$$R_o = \frac{R_L}{A^2} \tag{5}$$

In addition to the above, $t_o$ is the width at the base of the waveform of the pulse to be generated, $R_L$ is the resistance of the load resistor 14, and A is the secondary winding to primary winding turns ratio of the pulse transformer 10.

In the apparatus of the present invention, it has been found that the impedance branches 30, 31 which generate the first and third harmonic components, respectively, of the Fourier series produce a substantially accurate reproduction of a pulse having a waveform described by $\cos^2 \omega t$. Referring to Fig. 2, there is shown the manner in which the first harmonic 40 is combined with the third harmonic 42 signal, both of which are illustrated by a dashed line, are combined to produce the $\cos^2 \omega t$ waveform 44 illustrated by a solid line. In particular, the first and third harmonics 42 are generated so that they commence simultaneously, the first harmonic 40 making a positive alternation first while the third harmonic 42, on the other hand, commences with a negative alternation. A combination of the first and third harmonics 40, 42 produces the waveform 44 which, as previously specified, is substantially described by $\cos^2 \omega t$.

Referring again to Fig. 1, the parameter of the impedance branches 30, 31 are chosen as follows to generate a $\cos^2 \omega t$ pulse 44:

$$L_1 = 0.339 \, t_o \, R_o \text{ henrys}$$

$$L_3 = 0.623 \, t_o \, R_o \text{ henrys}$$

$$C_1 = 0.245 \, \frac{t_o}{R_o} \text{ farads}$$

$$C_3 = 0.01795 \, \frac{t_o}{R_o} \text{ farads}$$

wherein $t_o$ is expressed in seconds and $R_o$ is expressed in ohms. In choosing a value for $t_o$, consideration is given to the desired width of the pulse at, for example, 70% of its peak power level. In the event that it is desired that the pulse be 20 miscroseconds wide at 70% of the peak power level, the base width, $t_o$, for a pulse having a waveform described by $\cos^2 t$ would be approximately 55 microseconds.

Also, in accordance with the invention, each output terminal 33, 34 and 35 is connected to one terminal of a separate primary windings 46, 47 and 48, respectively, of the pulse transformer 10, the remaining terminal of each primary winding being referenced to a point of substantially fixed potential such as, for example, ground. Each of the primary windings 46, 47 and 48 have the same number of turns about a common core so that the ratio of the number of turns in a secondary winding 50 to the number of turns in each of the primary windings 46, 47 and 48 is the same in each instance, whereby each harmonic signal will retain its same relative magnitude across the load resistor 14. Also, the primary windings 46, 47 are poled relative to the secondary winding 50 as indicated in the drawing so as to combine the individual electrical waveforms 40, 42 in the manner specified in connection with the description of Fig. 2.

What is claimed is:

1. A pulse generating apparatus comprising a pulse forming network having an input terminal and first and second output terminals, said network including a first impedance branch connected from said input terminal to said first output terminal adapted to produce the fundamental Fourier component of a predetermined pulse waveform and a second impedance branch connected from said input terminal to said second output terminal adapted to produce the third harmonic Fourier component of said predetermined pulse waveform; a pulse transformer having first and second primary windings connected from said first and second output terminals, respectively, of said network to a terminal maintained at a substantially fixed potential and a secondary winding connected across a load impedance, said first and second primary windings and said secondary winding being disposed about a common core and poled to produce a signal representative of the algebraic sum of said Fourier components; means coupled to said input terminal of said pulse forming network for simultaneously charging said first and second impedance branches; and means responsive to trigger pulses connected from said input terminal of said pulse-forming network to said terminal maintained at said substantially fixed potential for discharging said network thereby to generate pulses having said predetermined waveform across said load impedance.

2. A pulse generating apparatus comprising a pulse forming network having an input terminal and first and second output terminals, said network including a first inductor and a first capacitor connected in series combination from said input terminal to said first output terminal, the values of the respective parameters of said first inductor and first capacitor being adapted to produce the fundamental Fourier component of a predetermined pulse waveform and a second inductor and a second capacitor connected in series combination from said input terminal to said second output terminal, the values of the respective parameters of said second inductor and second capacitor being adapted to produce the third harmonic Fourier component of said predetermined pulse waveform; a pulse transformer having first and second primary windings connected from said first and second output terminals, respectively, of said network to a terminal maintained at a substantially fixed potential and a secondary winding connected across a load impedance, said first and second primary windings and said secondary winding being disposed about a common core and poled to produce a signal representative of the algebraic sum of said Fourier components; means coupled to said input terminal of said pulse forming network for simultaneously charging said first and second capacitors; and means responsive to trigger pulses connected from said input terminal of said pulse-forming network to said terminal maintained at said substantially fixed potential for discharging said first and second capacitors of said network thereby to generate pulses having said predetermined waveform across said load impedance.

3. A pulse generating apparatus comprising a pulse forming network having an input terminal and first and second output terminals, said network including a first inductor and a first capacitor connected in series combination from said input terminal to said first output terminal, the values of the parameters of said first inductor and first capacitor being substantially equal to $0.339 \, t_o R_o$ henrys and $$0.245 \, \frac{t_o}{R_o}$$

farads, respectively, thereby to produce the fundamental Fourier component of a pulse waveform described by $\cos^2 \omega t$ wherein $t_o$ is the time duration thereof in seconds and $R_o$ is the effective load in ohms, and a second inductor and a second capacitor connected in series combination from said input terminal to said second output terminal, the values of the parameters of said second inductor and second capacitor being substantially equal to $0.623 \, t_o R_o$ henrys and $$0.01795 \, \frac{t_o}{R_o}$$

farads, respectively, thereby to produce the third harmonic Fourier component of said predetermined pulse waveform; a pulse transformer having first and second primary windings connected from said first and second output terminals, respectively, of said network to a terminal maintained at a substantially fixed potential and a secondary winding connected across a load impedance, said first and secondary primary windings and said secondary winding being disposed about a common core and poled in a manner to produce a signal representative of the algebraic sum of said Fourier components; means coupled to said input terminal of said pulse forming network for simultaneously charging said first and second capacitors; and means responsive to trigger pulses connected from said input terminal of said pulse-forming network to said terminal maintained at said substantially fixed potential for discharging said first and second capacitors of said network thereby to generate pulses having waveforms substantially described by $\cos^2 \omega t$ across said load impedance.

No references cited.